(12) United States Patent
Sato

(10) Patent No.: US 12,092,593 B2
(45) Date of Patent: *Sep. 17, 2024

(54) SINGLE-CRYSTAL X-RAY STRUCTURE ANALYSIS APPARATUS AND METHOD, AND SAMPLE HOLDER UNIT THEREFOR

(71) Applicant: Rigaku Corporation, Tokyo (JP)

(72) Inventor: Takashi Sato, Tokyo (JP)

(73) Assignee: Rigaku Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,263

(22) Filed: Aug. 4, 2023

(65) Prior Publication Data

US 2024/0027373 A1    Jan. 25, 2024

Related U.S. Application Data

(62) Division of application No. 17/295,855, filed as application No. PCT/JP2019/045686 on Nov. 21, 2019, now Pat. No. 11,802,844.

(30) Foreign Application Priority Data

Nov. 21, 2018  (JP) .................................. 2018-217815

(51) Int. Cl.
  *G01N 23/20025*   (2018.01)
  *G01N 1/28*   (2006.01)
  (Continued)

(52) U.S. Cl.
  CPC ......... *G01N 23/20025* (2013.01); *G01N 1/28* (2013.01); *G01N 23/20016* (2013.01); *G01N 23/207* (2013.01)

(58) Field of Classification Search
  CPC .............. G01N 23/20025; G01N 1/28; G01N 23/20016; G01N 23/207; G01N 2223/309
  See application file for complete search history.

(56) References Cited

U.S. PATENT DOCUMENTS

| 6,918,698 B2 | 7/2005 | Nordmeyer et al. |
| 7,274,769 B2 | 9/2007 | Nordmeyer et al. |

(Continued)

FOREIGN PATENT DOCUMENTS

| EP | 2 894 242 A1 | 7/2015 |
| JP | H06-194276 A | 7/1994 |

(Continued)

OTHER PUBLICATIONS

US Notice of Allowance issued in U.S. Appl. No. 17/295,856, USPTO, Alexandria VA U.S.A., Aug. 24, 2023, 41 pages.

(Continued)

*Primary Examiner* — David P Porta
*Assistant Examiner* — Mamadou Faye
(74) *Attorney, Agent, or Firm* — ASLAN LAW, P.C.

(57) ABSTRACT

A sample holder unit used for a single-crystal X-ray structure analysis apparatus, the sample holder unit comprising a sample holder for being attached to a goniometer in the single-crystal X-ray structure analysis apparatus, and an applicator that stores the sample holder, wherein the sample holder comprises a holding part that holds a porous complex crystal capable of soaking a sample in a plurality of fine pores formed therein, and the applicator comprises a space for soaking the sample in the porous complex crystal of the sample holder, wherein the applicator comprises a space for soaking the sample in the porous complex crystal of the sample holder, wherein the porous complex crystal is soaked only in a preserving solvent in the space.

3 Claims, 11 Drawing Sheets

(51) Int. Cl.
  *G01N 23/20016*  (2018.01)
  *G01N 23/207*  (2018.01)

(56) References Cited

U.S. PATENT DOCUMENTS

| | | | |
|---|---|---|---|
| 7,660,389 | B1 | 2/2010 | Becker |
| 7,696,991 | B2 | 4/2010 | Higashi |
| 10,190,952 | B2 | 1/2019 | Fujita et al. |
| 10,684,198 | B2 | 6/2020 | Fujita et al. |
| 11,802,844 | B2 * | 10/2023 | Sato ............ G01N 23/20025 |
| 2003/0068829 | A1 | 4/2003 | Giaquinta et al. |
| 2003/0152194 | A1 | 8/2003 | Nordmeyer et al. |
| 2005/0163280 | A1 | 7/2005 | Nordmeyer et al. |
| 2007/0005268 | A1 | 1/2007 | Higashi |
| 2007/0228049 | A1 | 10/2007 | Nordmeyer et al. |
| 2011/0317813 | A1 * | 12/2011 | Matsushita ......... H01J 35/10 378/70 |
| 2015/0219533 | A1 | 8/2015 | Fujita et al. |
| 2017/0160212 | A1 | 6/2017 | Kleine et al. |
| 2017/0219500 | A1 | 8/2017 | Fujita et al. |
| 2019/0137367 | A1 | 5/2019 | Fujita et al. |
| 2020/0096461 | A1 | 3/2020 | Fujita et al. |

FOREIGN PATENT DOCUMENTS

| | | |
|---|---|---|
| JP | H11-304999 A | 11/1999 |
| JP | 2003-083412 A | 3/2003 |
| JP | 2007-003394 A | 1/2007 |
| JP | 2013-156218 A | 8/2013 |
| JP | WO 2014/038220 A1 | 3/2014 |
| JP | 2014-130063 A | 7/2014 |
| JP | WO 2016/017770 A1 | 7/2017 |
| JP | 2018-155680 A | 10/2018 |
| WO | WO 2011/115223 A1 | 9/2011 |
| WO | WO 2015/132909 A1 | 9/2015 |
| WO | WO 2018/159692 A1 | 9/2018 |

OTHER PUBLICATIONS

US Office Action issued in U.S. Appl. No. 17/295,854, USPTO, USA, Mar. 28, 2023, 30 pages.
International Search Report issued in PCT Application No. PCT/JP2019/045685, Feb. 18, 2020, JPO, Japan, 2 pages.
EP Search Report issued in EP Application No. 19 887 578.3, Sep. 19, 2022, Germany, 8 pages.
JP Office Action issued in JP patent application No. 2020-557640, Jan. 10, 2023, Japan, 4 pages.
JP Office Action (Decision of Refusal) issued in JP patent application No. 2020-557640, Apr. 18, 2023, Japan, 4 pages.
US Office Action issued in U.S. Appl. No. 17/295,856, USPTO, Apr. 12, 2023, USA, 12 pages.
International Search Report issued in PCT Application No. PCT/JP2019/045687, Feb. 18, 2020, Japan, 3 pages.
EP Search Report issued in EP Application No. 19 886 255.9, Jul. 8, 2022, Germany, 8 pages.
JP Office Action issued in JP patent application No. 2020-557642, Japan, Jan. 10, 2023, Japan, 4 pages.
US Office Action issued in U.S. Appl. No. 17/295,857, USPTO, USA, Mar. 14, 2023, 17 pages.
CN Office Action issued in CN Application No. 201980088771.1, The State Intellectual Property Office of People's Republic of China, China, Dec. 14, 2023, 5 pages.
CN Office Action issued in CN Application No. 201980076225.6, The State Intellectual Property Office of People's Republic of China, China, Dec. 19, 2023, 8 pages.
CN Office Action issued in CN Application No. 201980076995.0, The State Intellectual Property Office of People's Republic of China, China, Dec. 26, 2023, 9 pages.
CN Office Action issued in CN Application No. 201980088789.1, The State Intellectual Property Office of People's Republic of China, China, Dec. 27, 2023, 7 pages.
Yasuhide Inokuma , Makoto Fujita et al; "X-ray analysis on the nanogram to microgram scale using porous complexes"; Nature 495, 461-466; Mar. 28, 2013.
Hoshino et al., "The crystalline sponge method updated", IUCrJ, (2016), 3, 139-151.
Yasuhide Inokuma, "'Crystal sponge' method overturns common sense of crystal structure analysis", Chemistry, vol. 68, No. 8, pp. 35-40, in particular, p. 39, fig.5, non-officieal translataion, Aug. 1, 2013.
Inokuma, Yasuhide et al, "X-ray crystallography of extremely small amount of compounds by crystal sponge method", Farumashia , 2014, vol. 50, No. 8, pp. 756-761, column "5. Application of crystal sponge method", fig. 4, non-official translation.
Japan Patent Office, Japanese Office Action (Decision of Refusal) issued in JP Patent Application No. 2020-557641, Japan, Apr. 18, 2023, 2 pages.
Japanese Patent Office, JP Office Action issued in JP Patent Application No. 2020-557641, Japan, Jan. 10, 2023, 4 pages.
US Notice of Allowance issued in U.S. Appl. No. 17/295,857, USPTO, Alexandria VA U.S.A., Jul. 11, 2023, 39 pages.
US Notice of Allowance issued in U.S. Appl. No. 17/295,856, USPTO, Alexandria VA U.S.A., Jul. 20, 2023, 39 pages.
European Patent Office, EP Search Report issued in EP Application No. 19 886 916.6, Sep. 14, 2022, 9 pages.
International Search Report issued in PCT Application No. PCT/JP2019/045689, Japan, Jan. 7, 2020, 3 pages.
EP Search Report issued in EP Application No. 19 886 782.2, Sep. 8, 2022, Germany, 8 pages.
JP Office Action issued in JP Application No. 2020-557644, Japan, Oct. 18, 2022, 4 pages.
US Office Action, USPTO, USA, U.S. Appl. No. 17/295,855, 32 pages.
US Notice of Allowance, USPTO, USA, U.S. Appl. No. 17/295,855, 38 pages.
International Search Report issued in PCT Application No. PCT/JP2019/045691, JPO, Japan, 3 pages, Feb. 18, 2020.
International Search Report issued in PCT Application No. PCT/JP2019/045686, WIPO/JPO, Feb. 18, 2020, 4 pages.
CN Office Action issued in CN Application No. 201980088771.1, The State Intellectual Property Office of People's Republic of China, China, May 31, 2024, 5 pages.

* cited by examiner

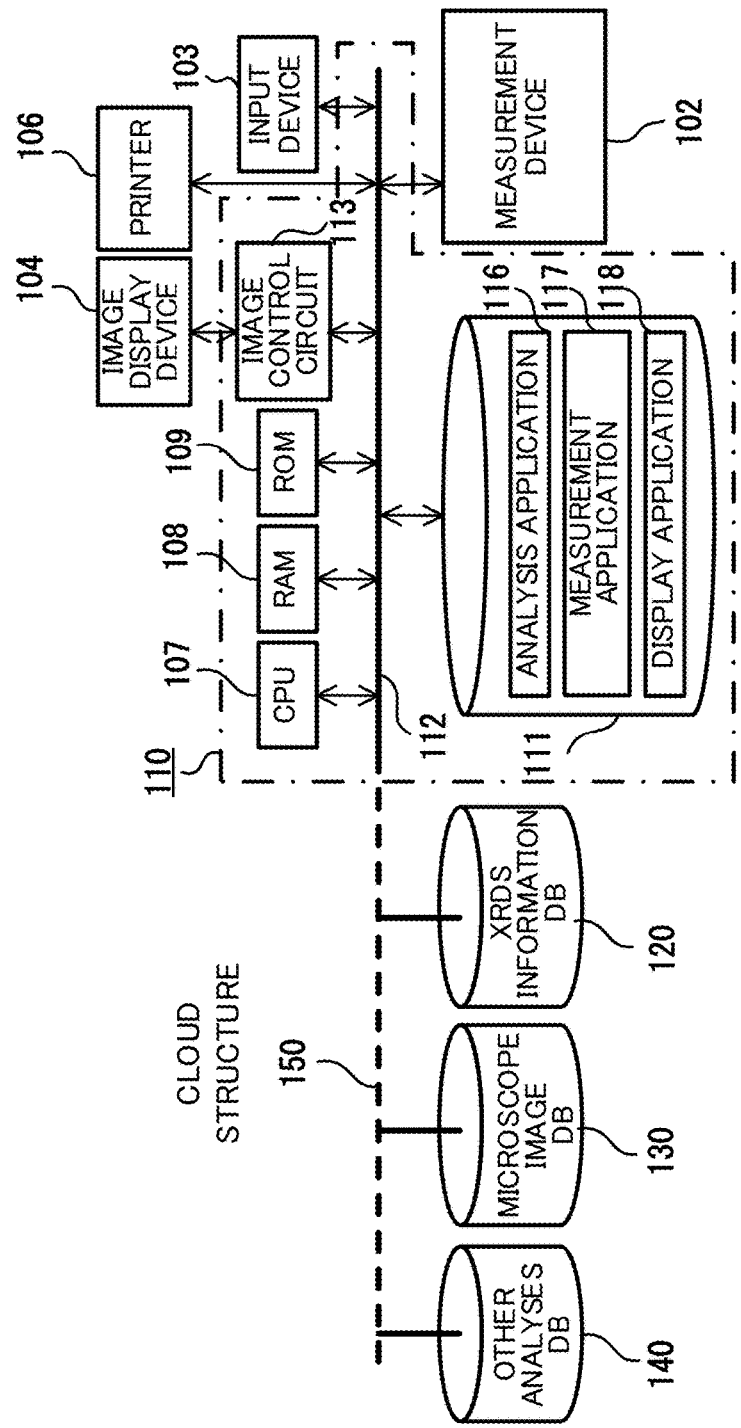
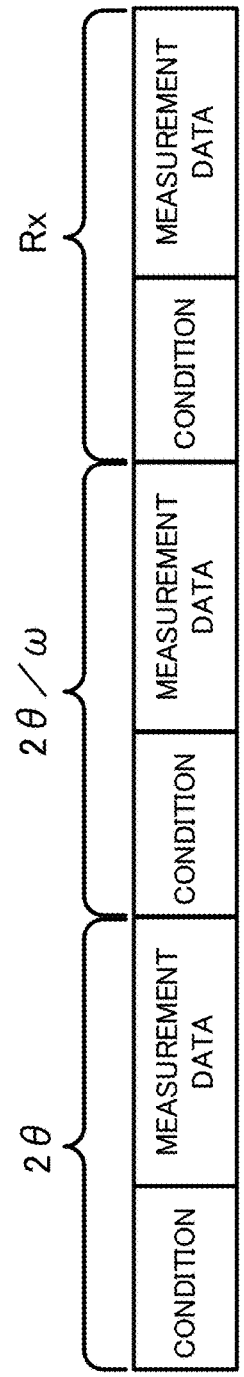
FIG. 3A
FIG. 3B

SINGLE-CRYSTAL X-RAY STRUCTURE ANALYSIS APPARATUS AND METHOD, AND SAMPLE HOLDER UNIT THEREFOR

CROSS-REFERENCE TO RELATED APPLICATIONS

This application is a Divisional of co-pending U.S. application Ser. No. 17/295,855 filed on May 20, 2021, and U.S. application Ser. No. 17/295,855 claims priority to JP Patent Application No. 2018-217815 filed on Nov. 21, 2018, and U.S. application Ser. No. 17/295,855 claims priority to and is a 371 of international PCT Application No. PCT/JP2019/045686 filed on Nov. 21, 2019. The entire contents of each of the above-identified applications are hereby incorporated by reference in their entirety.

TECHNICAL FIELD

The present invention relates to a next-generation single-crystal X-ray structure analysis apparatus capable of analyzing a structure of a material by an aggregative microstructure such as its atomic or molecular arrangement, and an analysis method therefor; and relates specifically to a single-crystal X-ray structure analysis apparatus and a method that comprise tools for performing processing including preparation of a single-crystal sample as an analysis object, and a sample holder unit therefor.

BACKGROUND ART

In research and development for new devices and materials, the materials are ordinarily synthesized and evaluated to determine the next research policy based on the foregoing. In a structure analysis of a material using X-ray diffraction for performing material development in a short period of time, a search method of a material structure centering on the material structure analysis capable of efficiently performing the structure analysis, and an X-ray structure analysis used therein are indispensable for efficiently searching the material structure that realizes the function/physical property of an object material.

However, it has been difficult for those other than X-ray specialists to perform the structure analysis based on the results obtained by the foregoing method. Therefore, an X-ray structure analysis system with which the structure analysis can be performed by anyone who is not even a specialist of X-rays has been demanded. In this regard, particularly, as is known from the following Patent Document 1, the single-crystal X-ray structure analysis has gained attention as a method capable of catching a precise and highly accurate three-dimensional structure of molecules.

On the other hand, in this single-crystal X-ray structure analysis, there has been such a large constraint that a single-crystal needs to be prepared by crystallizing a sample. However, as is known from not only the following Non-Patent Documents 1 and 2 but also Patent Document 2, the single-crystal X-ray structure analysis becomes widely applicable for those including a liquid compound that cannot be crystallized, a sample incapable of acquiring a sufficient amount for crystallization, and so forth by development of a material called "crystalline sponge" (for example, a porous complex crystal in which countless pores each having a diameter of 0.5 to 1 nm are formed).

PRIOR ART DOCUMENT

Patent Document

Patent Document 1: Japanese Unexamined Patent Application Publication No. 2007-3394
Patent Document 2: Re-publication of PCT International Publication WO2016/017770

Non-Patent Document

Non-Patent Document 1: Makoto Fujita; X-ray analysis on the nanogram to microgram scale using porous complexes; Nature 495, 461-466; 28 Mar. 2013
Non-Patent Document 2: Hoshino et al. (2016), The updated crystalline sponge method IUCrJ, 3, 139-151

SUMMARY OF THE INVENTION

Problems to be Solved by the Invention

However, in the single-crystal X-ray structure analysis as a conventional technique in which the above-described crystalline sponge is used, it is necessary to quickly and accurately perform a step of soaking a sample of a very small amount of approximately several ng to several μg separated by various devices in a framework of a very small and fragile crystalline sponge having a size of approximately 100 μm, and further a step of accompanying fine and precise operations in which the very small crystalline sponge in which the sample is soaked is taken out; is attached to a tool; and is installed at the X-ray irradiation position inside a single-crystal X-ray structure analysis apparatus. In addition, these fine and precise operations carried out in a short period of time largely affect the measurement result of the sample after being soaked in the crystalline sponge, thereby being very important operations.

Accordingly, the present invention has been achieved in view of problems in the above-described conventional technique, and the objective is, specifically, to enable quickly, surely and easily performing single-crystal X-ray structure analysis without conventionally fine and precise operations for which quickness is required being accompanied, with a very small and fragile crystalline sponge, even if not having specialized knowledge of X-ray structure analysis, in other words, the object is to provide a high-yield, efficient, very versatile and user-friendly single-crystal X-ray structure analysis apparatus and a method therefor; and further to provide a sample holder unit comprising an applicator and a new sample holder, as a tool therefor.

Means to Solve the Problems (1) In order to achieve the above-described object, it is a feature that the single-crystal X-ray structure analysis apparatus according to the present invention is a single-crystal X-ray structure analysis apparatus that performs a structure analysis of a material, the apparatus comprising an X-ray source that generates X-rays; a sample holder that holds a sample; a goniometer that rotationally moves, the sample holder being attached to the goniometer; an X-ray irradiation section that irradiates the X-rays from the X-ray source to the sample held by the sample holder attached to the goniometer; an X-ray detection measurement section that detects and measures X-rays diffracted or scattered by the sample; and a structure analysis section that performs a structure analysis of the sample based on the diffracted or scattered X-rays detected by the X-ray detection measurement section, wherein the sample holder is provided by being attached to an attachable/detachable applicator, is comprising a porous complex crystal capable of soaking the sample in a plurality of fine pores formed therein, and is attached to the position to where the X-rays from the X-ray irradiation section of the goniometer are irradiated, in a state where the sample holder is removed from the applicator, and wherein the applicator comprises a space for soaking the sample in the porous complex crystal of the sample holder.

(2) Further, it is a feature that the sample holder unit according to the present invention is a sample holder unit used in a single-crystal X-ray structure analysis apparatus, the sample holder unit comprising a sample holder to be attached to a goniometer in the single-crystal X-ray structure analysis apparatus, and an applicator that stores the sample holder, wherein the sample holder comprises a holding part that holds a porous complex crystal capable of soaking a sample in a plurality of fine pores formed therein, and the applicator comprises a space for soaking the sample in the porous complex crystal of the sample holder.

(3) Further, it is a feature that in the sample holder unit according to the present invention, a sample introduction structure to be introduced into the space for soaking the sample therein is formed in the applicator.

(4) Further, it is a feature that in the sample holder unit according to the present invention, the sample introduction structure formed in the applicator is a through-hole.

(5) Further, it is a feature that the single-crystal X-ray structure analysis method according to the present invention is a single-crystal X-ray structure analysis method for performing a structure analysis of a material, using a sample holder; the method comprising a step of soaking a sample in a porous complex crystal of the sample holder that comprises the porous complex crystal capable of soaking the sample in a plurality of fine pores formed therein, and that is provided and stored in an applicator comprising a space for soaking the sample therein, by introducing the sample thereinto in a state where the sample holder is stored in the applicator; a step of removing the sample holder from the applicator; a step of attaching the sample holder to a goniometer in the single-crystal X-ray structure analysis apparatus; a step of X-ray detection measurement where X-rays diffracted or scattered by the sample are detected and measured by irradiating the X-rays from an X-ray source in the single-crystal X-ray structure analysis to the sample attached to the goniometer; and a step of performing the structure analysis of the sample, based on the diffracted or scattered X-rays detected by the step of X-ray detection measurement.

Effect of the Invention

According to the above-described present invention, a series of operations including soaking a sample in a very small and fragile crystalline sponge, followed by installing it in a device can be quickly, surely and safely carried out by using a newly proposed sample holder unit comprising a sample holder and an applicator, without accompanying conventional precise and fine operations for which quickness is also required; in other words, a high-yield, efficient, very versatile and user-friendly single-crystal X-ray structure analysis apparatus is provided. Further, an analysis method therefor and the sample holder unit comprising the applicator and the sample holder, as a tool therefor. Thus, it becomes possible to make a single-crystal X-ray structure analysis with a crystalline sponge easily usable, and to widely spread i.

BRIEF DESCRIPTION OF THE DRAWINGS

FIG. 3A is a block diagram showing an electrical configuration inside the above-described single-crystal X-ray structure analysis apparatus. FIG. 3B is a configuration inside the data file.

DETAILED DESCRIPTION OF EMBODIMENTS

Next, the single-crystal X-ray structure analysis apparatus in which a crystalline sponge is used, according to one embodiment of the present invention, is described in detail referring to the attached drawings. In addition, the expression of "A or B" in the present application means "at least one of A and B", and includes "A and B" unless there are exceptional circumstances where no possibility of A and B exists.

Figure 1:
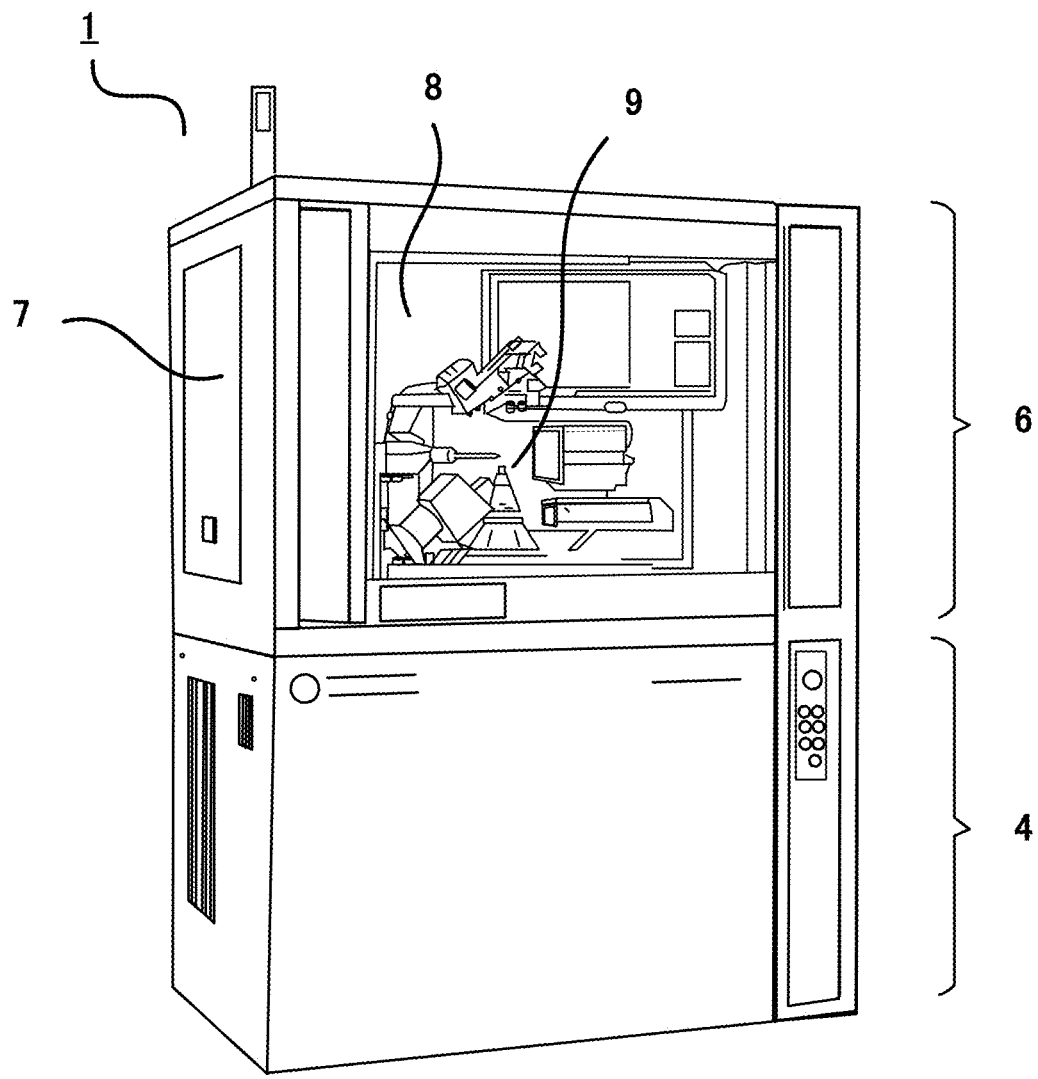
FIG. 1 is a diagram showing a whole configuration of a single-crystal X-ray structure analysis apparatus provided with a single-crystal X-ray diffractometer that is to be one embodiment of the present invention.

The attached FIG. 1 shows the entire appearance configuration of a single-crystal X-ray structure analysis apparatus provided with a single-crystal X-ray diffractometer according to one embodiment of the present invention, and as is clear from the figure, the single-crystal X-ray structure analysis apparatus 1 comprises a base stand 4 in which a cooling device and an X-ray generation power supply unit are stored, and an X-ray protection cover 6 placed on the base stand 4.

The X-ray protection cover 6 is provided with a casing 7 for surrounding the single-crystal X-ray diffractometer 9, a door 8 provided in front of the casing 7, and so forth. The door 8 provided in front of the casing 7 is openable, and in this open state, various operations can be performed for the internal single-crystal X-ray diffractometer 9. In addition, the present embodiment as shown in the figure is directed to the single-crystal X-ray structure analysis apparatus 1 provided with the single-crystal X-ray diffractometer 9 for performing a structure analysis of a material using the crystalline sponge mentioned below.

Figure 2:
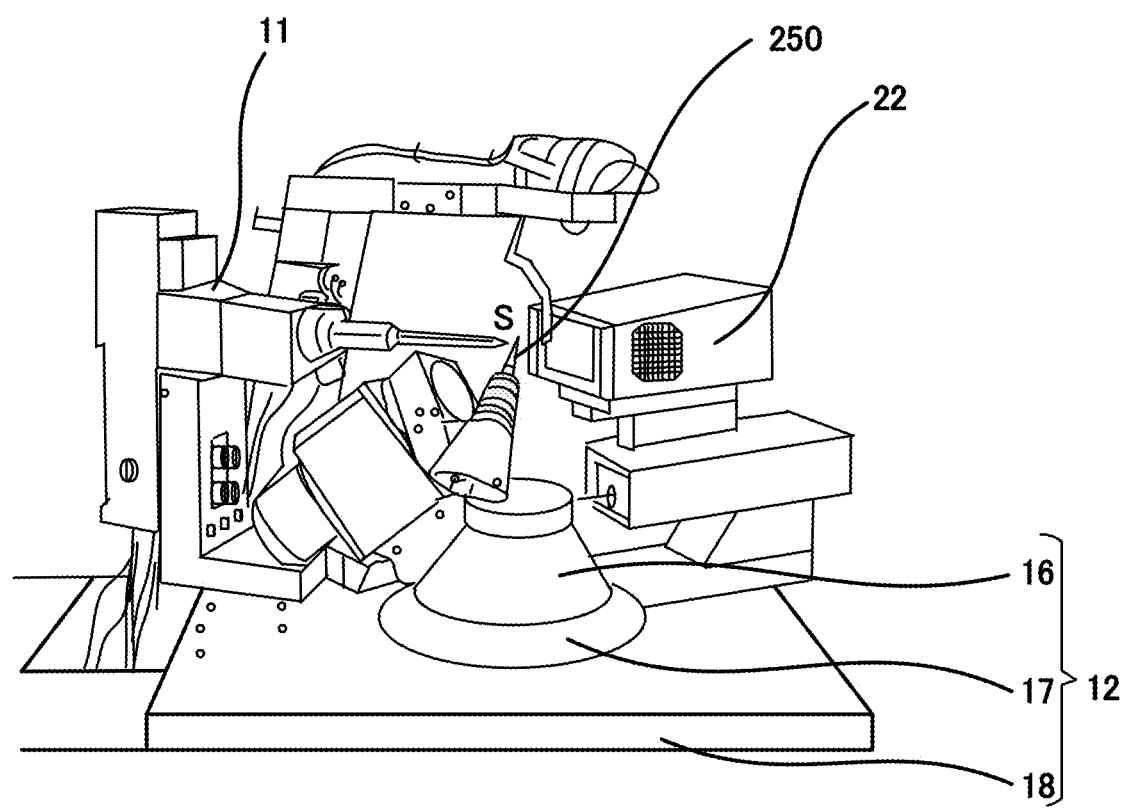
FIG. 2 is a diagram showing a configuration of the above-described single-crystal X-ray diffractometer.

The single-crystal X-ray diffractometer 9 comprises an X-ray tube 11 and a goniometer 12, as shown in FIG. 2 as well. The X-ray tube 11 comprises a filament, a target (referred to also as "anticathode") arranged so as to be opposed to the filament, and a casing for airtightly storing them, though not shown in the figure herein. This filament subjected to current applied by the X-ray generation power supply unit stored in the base stand 4 of FIG. 1 generates heat to emit thermal electrons. Further, a high voltage is applied between the filament and the target by the X-ray generation power supply unit, and the thermal electrons emitted from the filament are accelerated by the high voltage, and collide with the target. This collision area forms an X-ray focus, and X-rays are generated from the X-ray focus, and are spread out. In more detail, though not shown in the figure herein, the X-ray tube 11 comprising a microfocus tube and an optical element such as a multilayer focusing mirror or the like enables irradiation with higher brightness beam, and can also be selected from a radiation source such as Cu, Mo, Ag or the like. As exemplified above, the filament, the target arranged so as to be opposed to the filament, and the casing for airtightly storing them serve as an X-ray source, and a configuration for X-ray irradiation comprising the microfocus tube and the optical element such as the multilayer focusing mirror or the like serves as an X-ray irradiation section.

Further, the goniometer 12 supporting a sample S to be analyzed comprises a θ rotation table 16 that is rotatable centering on a sample axis line w passing through an X-ray incident point of the sample S, and a 2θ rotation table 17 that is arranged around the θ rotation table 16 and is rotatable centering on the sample axis line ω. In addition, according to the present embodiment, the sample S is soaked inside a crystalline sponge previously attached to a part of the sample holder 250 mentioned below. Driving apparatus (not shown in the figure) for driving the above-described θ rotation table 16 and 2θ rotation table 17 are stored inside a base 18 of the goniometer 12, and the θ rotation table 16 is driven by these driving devices to be intermittently or continuously rotated at a predetermined angular speed so as to make a so-called θ rotation. Further, the 2θ rotation table 17 is driven by these driving devices to be intermittently or continuously rotated so as to make a so-called 2θ rotation. The above-described driving devices can be constituted from any structure, and for example, can be constituted from a power transmission structure comprising a worm and a worm wheel.

An X-ray detector 22 is placed on a part of the outer periphery of the goniometer 12, and the X-ray detector 22 is constituted from for example, CCD type and CMOS type two-dimensional pixel detectors, a hybrid type pixel detector, or the like. In addition, an X-ray detection measurement section means a configuration in which X-rays diffracted or scattered by the sample are detected and measured, and comprises the X-ray detector 22 and a control section that controls the same.

The single-crystal X-ray diffractometer 9 is constituted as described above, and thus the sample S is θ-rotated centering on the sample axis line ω by the θ rotation of the θ rotation table 16 in the goniometer 12. During the θ rotation of this sample S, X-rays generated from the X-ray focus inside the X-ray tube 11, that is directed to the sample S enter the sample S at a predetermined angle, and are diffracted/scattered. That is, the incident angle of X-rays entering the sample S changes depending on the θ rotation of the sample S.

When the Bragg diffraction condition between an incident angle of X-rays entering the sample S and a crystal lattice plane is satisfied, diffraction X-rays are generated from the sample S. The diffraction X-rays are received by the X-ray detector 22 to measure an X-ray intensity thereof. From those described above, an angle of the X-ray detector 22 with respect to the incident X-rays, that is, an intensity of the diffraction X-rays corresponding to a diffraction angle is measured, and a crystal structure concerning the sample S and so forth are analyzed from this measurement result.

Next, FIG. 3A shows one example of the detail of an electrical internal configuration constituting a control section 110 in the above-described single-crystal X-ray structure analysis apparatus. In addition, as a matter of course, the present invention is not limited to the following embodiments according to the present invention.

This single-crystal X-ray structure analysis apparatus 1 includes the above-described internal configuration and further comprises a measurement device 102 for measuring a suitable material used as a sample; an input device 103 constituted from a keyboard, a mouse and so forth; an image display device 104 as display means; a printer 106 as means for printing and outputting the analysis result; CPU (Central Processing Unit) 107; RAM (Random Access Memory) 108; ROM (Read Only Memory) 109; a hard disk 111 as an external storage medium, and so forth. These elements are electrically and mutually connected by a bus 112.

The image display device 104 constituted from an image display unit such as a CRT display, a liquid-crystal display or the like displays an image on a screen in accordance with an image signal generated by an image control circuit 113. The image control circuit 113 generates the image signal based on image data input therein. The image data input in the image control circuit 113 is generated by an operation of various calculation means, achieved by a computer comprising CPU 107, RAM 108, ROM 109, and the hard disk 111. An inkjet plotter, a dot printer, an inkjet printer, an electrostatic transfer printer, or any other printing unit having arbitrary structure can be used for the printer 106. In addition, the hard disk 111 can also be constituted from a magneto-optical disk, a semiconductor memory, or any other storage medium having arbitrary structure.

Analysis application software 116 for managing the overall operation of the single-crystal X-ray structure analysis apparatus 1, measurement application software 117 for managing the operation of the measurement processing using the measurement device 102, and display application software 118 for managing the operation of the display processing using the image display device 104 are stored inside the hard disk 111. A predetermined function is achieved after reading these pieces of application software from the hard disk 111, as needed, to transfer them to RAM 108.

This single-crystal X-ray structure analysis apparatus 1 further comprises for example, a database placed in a cloud area, the database for storing various measurement results including measurement data obtained by the above-described measurement device 102. Referring to an example of the figure, as is explained below, an XRDS information database 120 that stores XRDS image data obtained by the above-described measurement device 102, and a microscope image database 130 that stores actually observed images obtained by the microscope, and further, for example, measurement results obtained by analysis performed with not X-rays but XRF, Raman ray or the like, and another analysis database 140 that stores physical property information are shown. In addition, these databases are not necessarily stored inside the single-crystal X-ray structure analysis apparatus 1, and for example, they may be provided outside and be communicably connected mutually through a network 150 or the like.

A method of storing individual measurement data inside an individual file is also taken into account as a file management method for storing a plurality of pieces of measurement data inside a data file, but according to the present embodiment, as shown in FIG. 3B, the plurality of pieces of measurement data are set to be continuously stored inside one data file. In addition, referring to FIG. 3B, storage areas each in which "condition" is written are an area for storing every kind of information including device information and measurement conditions when obtaining the measurement data.

As such measurement conditions, (1) name of measurement object material, (2) type of measurement device, (3) measurement temperature range, (4) measurement start time, (5) measurement end time, (6) measurement angle range, (7) moving speed in scanning movement system, (8) scanning condition, (9) type of X-rays incident on sample, (10) whether or not to use attachments such as a sample high-temperature device, and so forth, are conceivable and various of other conditions is also conceivable.

Figure 4:
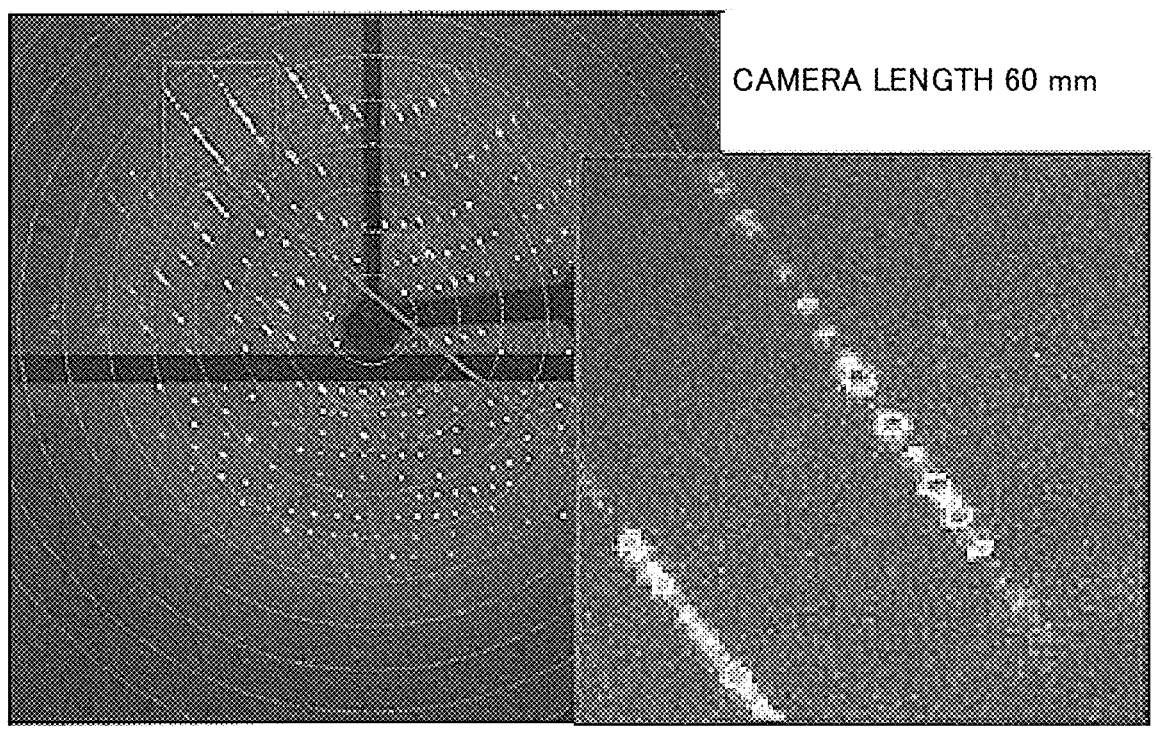
FIG. 4 is a diagram including a photograph showing an XRDS pattern or an image obtained by the above-described single-crystal X-ray structure analysis apparatus.

An XRDS (X-ray Diffraction and Scattering) pattern or an image (Refer to FIG. 4) is obtained by receiving/accumulating X-rays received on a flat plane that is a two-dimensional space of the X-ray detector 22 constituting the above-described measurement device 102 for each pixel arranged in planar array, that constitutes the detector, and by measuring an intensity thereof. For example, a pattern or an image on a two-dimensional space of r and θ can be obtained by detecting the intensity of X-rays received by an integral, for each pixel of the X-ray detector 22.

<Measurement Application Software>

The XRDS pattern or the image on an observation space, that is obtained by diffraction and scattering of X-rays caused by an object material for irradiation of the X-rays reflects information of an electron density distribution in an actual space of the object material. However, the XRDS pattern being on the two-dimensional space of r and θ does not directly represents symmetry in the actual space of the object material as a three-dimensional space. Accordingly, it is generally difficult to specify the (spatial) arrangement of atoms and molecules that constitute the material with only the existing XRDS image, and thus a specialized knowledge of X-ray structure analysis is required. Therefore, according to the present Example, automatization is achieved by adopting the above-described measurement application software. In this manner, the single-crystal X-ray structure analysis apparatus 1 receives and manages various measurement results including measurement data obtained by detecting X-rays diffracted or scattered by a sample with the X-ray detection measurement section while controlling a measurement processing operation using the measurement device 102. Further, the sample is subjected to structure analysis with a structure analysis section, based on various measurement results including the measurement data obtained by detecting the X-rays diffracted or scattered by the sample.

Figure 5A:
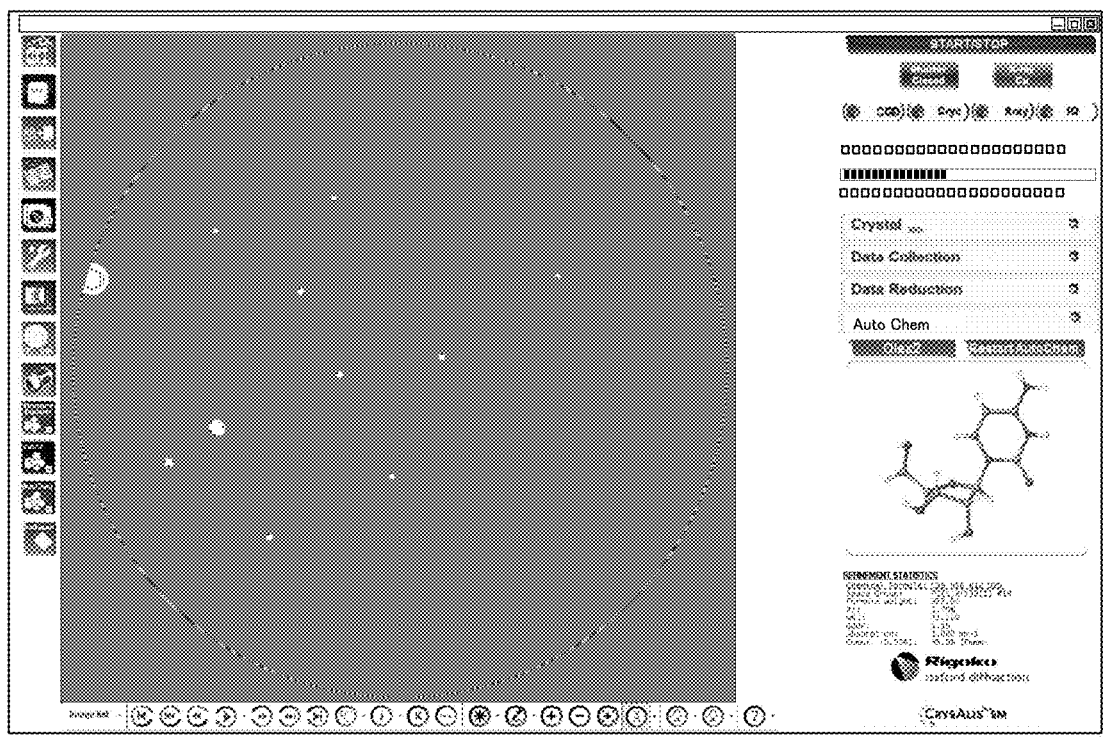
FIG. 5A(5B) is a diagram including a photograph showing one example of a screen obtained by executing X-ray diffraction data measurement/processing software on the above-described single-crystal X-ray structure analysis apparatus.
Figure 5B:
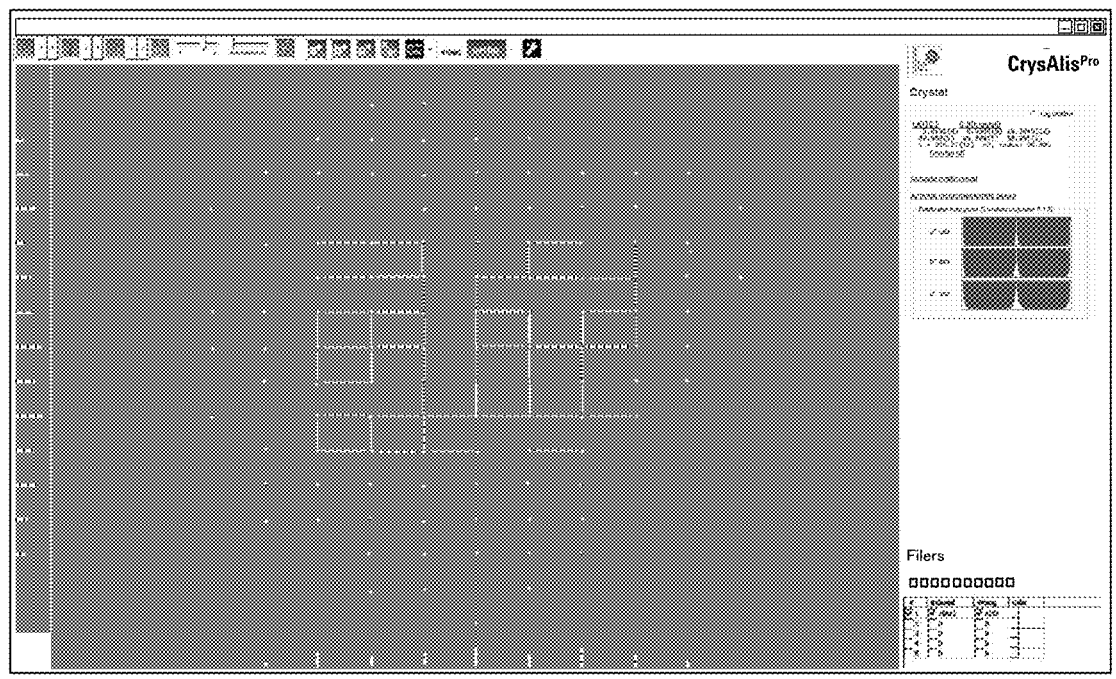
Figure 6:
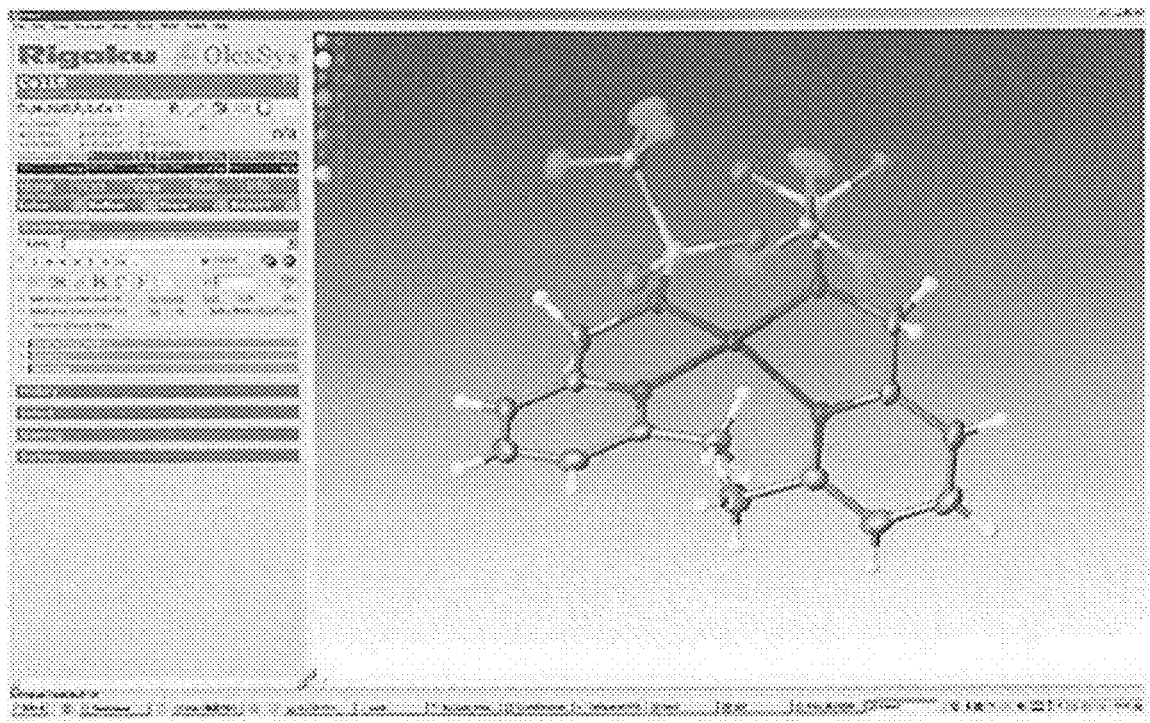
FIG. 6 is a diagram including a screen showing a molecular model prepared using a structure analysis program of the above-described single-crystal X-ray structure analysis apparatus.

For one example, as shown in the execution screens of FIGS. 5A and 5B, X-ray diffraction data measurement/processing software called "CrysAlis$^{Pro}$" that is a platform for single-crystal structure analysis is installed to execute preliminary measurement, setting of measurement conditions, main measurement, data processing and so forth. Further, structure analysis and structure refinement are executed in parallel with X-ray diffraction data collection by installing an automatic structure analysis plug-in called "AutoChem". Then, from space group determination to phase determination, construction and correction of molecular modelling, structure refinement, final reporting, and preparation of a CIF file are executed by a structure analysis program called "Olex$^2$" as also shown in FIG. 6.

The whole structure of the single-crystal X-ray structure analysis apparatus 1, and its function have been described as above, and a crystalline sponge according to the present invention, and device and tools related thereto are specifically described below in detail, referring to the attached drawings.

<Crystalline sponge>

As described above, the single-crystal X-ray structure analysis has become widely applicable for those including a liquid compound that cannot be crystallized, a very small amount of a sample with several ng to several μg that is incapable of acquiring a sufficient amount to perform crystallization, or the like due to development of a material called "crystalline sponge" as a very small and fragile porous complex crystal having an approximate size of several 10 μm to several 100 μm, in whose inside countless pores each having a diameter of 0.5 to 1 nm are formed.

However, in the current situation, in order to perform soaking (post-crystallization) as crystallization of a sample into a framework of the above-described crystalline sponge, as previously described, a step of soaking a very small amount of a sample, approximately several ng to several μg, separated by various pretreatment (separation) apparatus in a framework of a very small and fragile crystalline sponge having an outer diameter of approximately 100 μm provided after being immerged in a preserving solvent (carrier) such as cyclohexane or the like, inside a container, is required. Examples of the preserving solvent (carrier) include liquid, a gaseous body (gas), and a supercritical fluid in the middle of them. Further, subsequently, a step of taking out, from a container, a very small, fragile and difficultly handleable crystalline sponge in a quick manner (in a short period of time in such an extent that the crystalline sponge is not broken due to drying), and accurately attaching it to an X-ray irradiation position inside a single-crystal X-ray diffractometer, more specifically, to a tip portion of a sample axis of the goniometer 12 (so-called goniometer head pin) while performing centering, is required. These steps are not only fine operations for which high preciseness is required but also those for which quickness is required for the operator, whether having a specialized knowledge of X-ray structure analysis, thereby resulting in having a large influence on the measurement result of a sample after being soaked in the crystalline sponge. That is, these operations make single-crystal X-ray structure analysis using a very small crystalline sponge result in low yield, and thus this becomes one of the causes of suppressing the single-crystal X-ray structure analysis using the crystalline sponge from being widely used.

The present invention that has been accomplished based on the above-described inventor's knowledge enables quickly, surely and easily performing a single-crystal X-ray structure analysis with a very small and fragile crystalline sponge by using a sample holder unit comprising an applicator and a sample holder for the crystalline sponge (also referred to simply as a sample holder), as a handling (operating) tool, as described below, in other words, achieves a high-yield, efficient, very versatile and user-friendly single-crystal X-ray structure analysis apparatus. That is, as to the next-generation single-crystal X-ray structure analysis apparatus according to the present invention, there is a large constraint that the very small and fragile crystalline sponge in which a very small amount of a sample S is soaked is prepared, and further the sample S (crystalline sponge) needs to be taken up from a soaking container and precisely and quickly attached to a predetermined position at the tip portion of the goniometer 12 in a short period of time in such an extent that the crystalline sponge is not broken due to drying, but specifically in order to achieve the very versatile and user-friendly apparatus, such operations need to be made quickly and easily executable without requiring highly specialized knowledge as well as operation preciseness.

The present invention described below in detail resolves such a problem, that is, provides an apparatus and a method for performing a high-yield efficient, very versatile and user-friendly single-crystal X-ray structure analysis quickly, surely and easily by anyone while also using a very small, fragile and difficultly handleable crystalline sponge; and further provides a sample holder unit comprising an applicator and a sample holder, as a tool therefor.

Figure 7A:
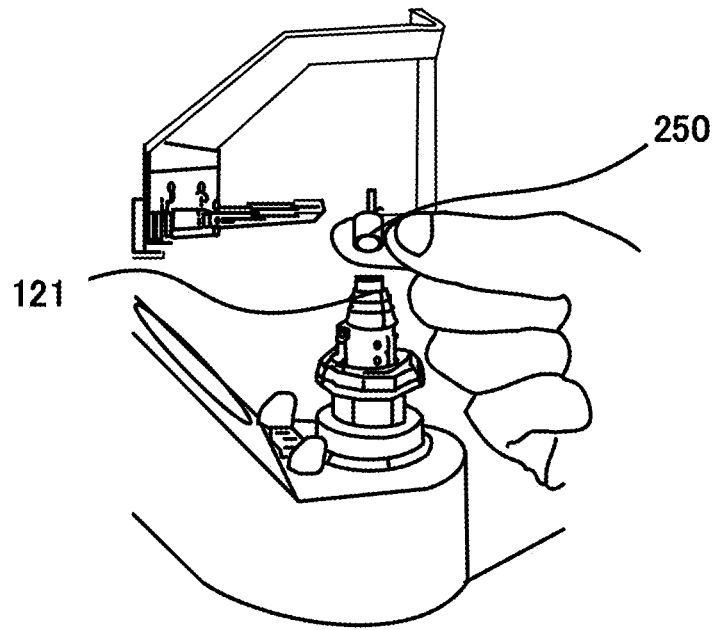
FIG. 7A is a diagram including a photograph showing one example of a structure centering on a goniometer of the above-described single-crystal X-ray diffractometer.
Figure 7B:
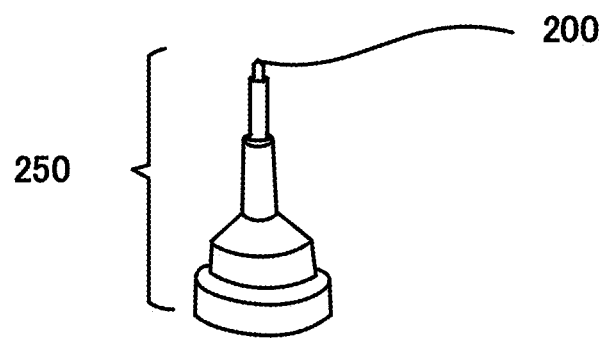
FIG. 7B is a diagram showing the sample holder.

FIG. 7A shows a tip portion of the goniometer 12 in an enlarged view, and this figure shows a state that, the sample holder 250, being in an enlarged view as FIG. 7B, as a tool where the crystalline sponge 200 soaking a sample to be analyzed that is proposed according to the present invention is attached (mounted) to the goniometer head 121 as the tip portion of the goniometer 12 in advance. In addition, the sample holder 250, for example, can be attached/detached to/from the goniometer head 121 at the tip portion of the goniometer 12 by an attaching/positioning mechanism for which magnetic force or the like is used, and can be attached easily and accurately at an exact position by anyone.

<Sample Holder for Crystalline Sponge, and Applicator>

Figure 8:
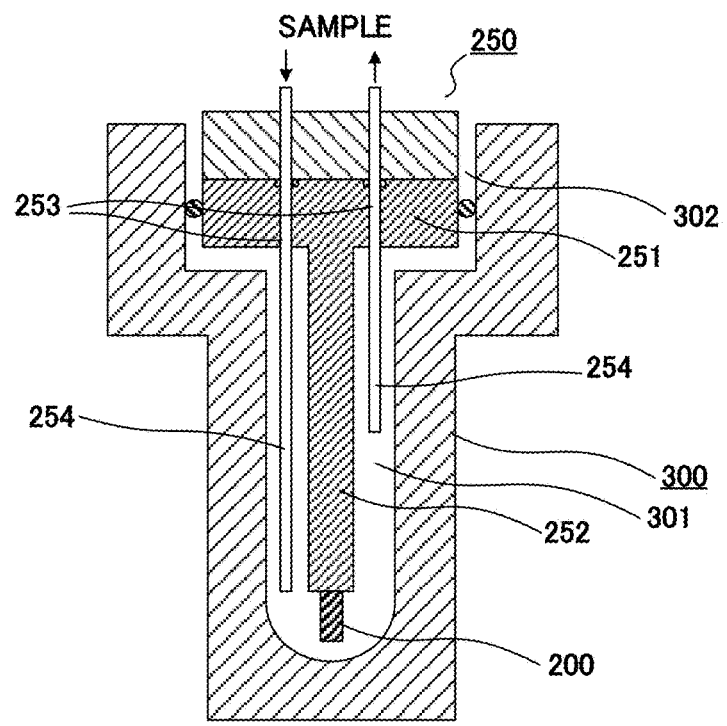
FIG. 8 is a sectional view showing one example of a sample holder unit comprising an applicator and a sample holder, to be attached to the goniometer.

FIG. 8 shows a sectional view of the above-described sample holder 250. In the sample holder 250, a pin (cylinder)-shaped sample holding part (hereinafter, referred to simply as a holding part) 252 (corresponding to the so-called goniometer head pin) is implanted vertically in the center of one surface (the lower surface in the figure) of the base part 251 of a disk or corn-shaped holder made of metal or the like attached to the goniometer head 121 {Refer to FIG. 7A} at the tip portion of the goniometer 12, and the crystalline sponge 200 in which the above-described sample to be analyzed is soaked is combinedly attached and fixed to the sample holder 250 beforehand at a predetermined position of the tip of the pin-shaped holding part 252. Further, the positioning mechanism or the like such as a magnet that is not shown in the figure, or the like is provided on the other surface (upper surface in the figure) of the disk-shaped base part 251. The sample holder 250 is detachably attached to the tip portion of the goniometer 12 by this positioning mechanism.

Further, in FIG. 8, the so-called applicator 300 used with the sample holder 250 is shown as a handling (operating) tool for soaking the sample in the crystalline sponge 200 attached to the sample holder in advance. This applicator 300 is, for example, formed from a transparent or non-transparent member made of glass, a resin, metal or the like, in whose inside a storing space 301 for storing the above-described sample holder 250 is formed, and at whose upper portion the opening 302 through which the sample holder 250 is fitted and taken out is further formed. In addition, according to the present invention, the sample holder unit comprises the applicator 300 and the sample holder 250.

Further, for example, seal portions (each shown by ° in the figure) are provided at part of the opening 302 of the applicator 300 so as to be airtightly maintained from outside in a state of storing the sample holder 250 in the storing space 301 inside thereof. On the other hand, a pair of fine through holes 253, 253 for introducing a sample to be analyzed into the crystalline sponge 200 located inside (storing space 301) the applicator 300 are formed at the base part 251 of the sample holder 250. The fine holes 253, 253 exhibit preferable one example of a sample introduction structure, and other structures may be adopted. In addition, though not shown in the figure, seal portions are provided for these fine holes 253, 253. In this manner, as shown in the figure, the storing space 301 inside the applicator 300 is kept airtight even in a state where sample introduction tubes (hereinafter, referred to simply as introduction tubes) 254, 254 for introducing the sample into the crystalline sponge 200 are inserted in the fine holes 253, 253.

According to the sample holder 250 with such a configuration, alternatively, further by being combinedly provided (unified) with the applicator 300 as a handling (operating) tool thereof, the crystalline sponge 200 attached to the tip portion of the pin-shaped holding part 252 (corresponding to a goniometer head pin) constituting a part of the sample holding 250 can be safely and easily handled without damage or deviation from the sample holder 250, inside the applicator 300. That is, the crystalline sponge 200 in which a very small amount of the sample is soaked can be safely, simply and easily prepared on the goniometer head 121 in a short and quick period of time in such an extent that no damage occurs due to drying, without any damage due to taking only it out from a soaking container like a conventional manner. According to the present Example, the sample holder 250 with which soaking of the sample is completed is removed from the applicator 300, and is attached to the goniometer head 121 {Refer to FIG. 7A} at the tip portion of the goniometer 12. In this manner, the sample S soaked in the crystalline sponge 200 is easily, precisely and quickly arranged at a predetermined position inside the single-crystal X-ray diffractometer 9 without requiring highly specialized knowledge and precise operations.

Figure 9:
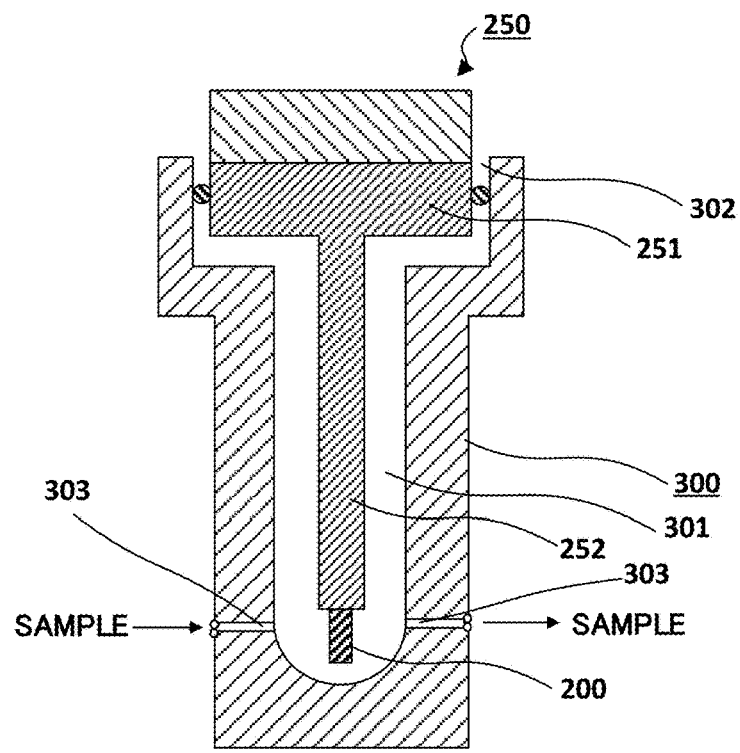
FIG. 9 is a sectional view showing a sample holder unit comprising an applicator and a sample holder, that is to be another Example according to the present invention.

In addition, it is described in the above-described example that a pair of fine through holes 253, 253 for introducing a sample to be analyzed into the crystalline sponge 200 positioned inside the applicator 300 (storing space 301) are formed as a part of the base part 251 of the sample holder 250, but the present invention is not limited thereto, and these fine holes, for example, may be formed as a part of the applicator 300 as shown in the attached FIG. 9 by symbols 303, 303.

Figure 10:
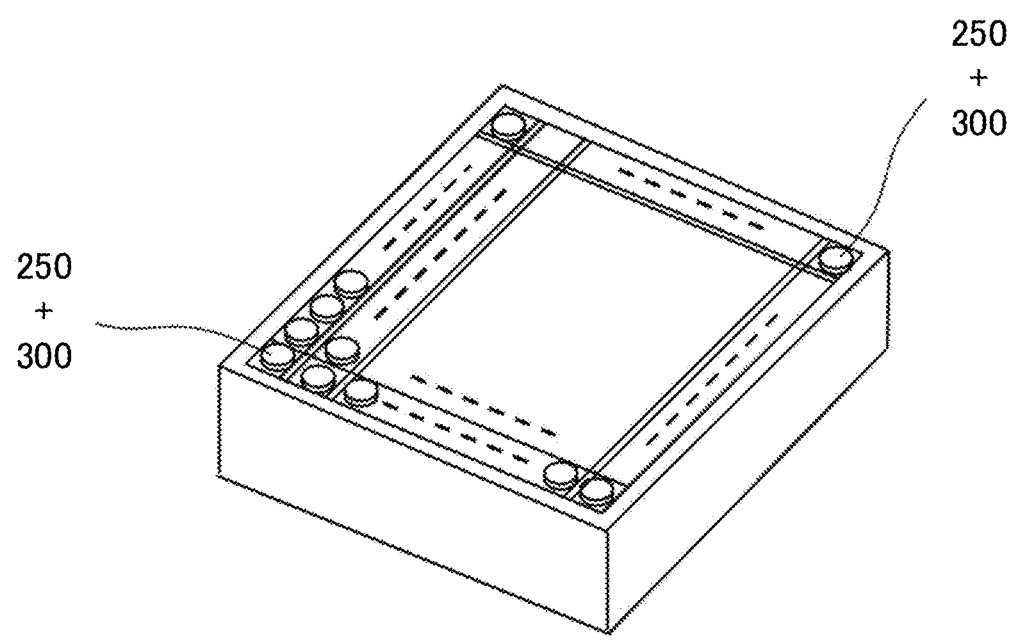
FIG. 10 is a diagram showing one example of a state in a case of providing the above-described sample holder as a set.

Further, when introducing the sample to be analyzed into the crystalline sponge 200, by using a soaking apparatus (soaking machine) with which one example is described below, more specifically, by inserting a pair of sample introduction tubes 254, 254 from the apparatus in fine through holes 253, 253 (or 303, 303), and introducing a very small amount of the sample into the above-described very small crystalline sponge 200, it is possible to soak the sample in the necessary crystalline sponge 200. Further, the sample holder 250 can be integrated (unified) with the applicator 300 as a handling (operating) tool thereof, and further can be provided as a so-called set by preparing the required number of them for the analysis operation and storing them in a box-shaped case, as also shown in FIG. 10.

<Single-Crystal X-Ray Structure Analysis Method Using Sample Holder for Crystalline Sponge, and Applicator>

Next, the single-crystal X-ray structure analysis method performed using the sample holder 250 to which the crystalline sponge 200 is previously attached, combinedly with the applicator 300 as a handling tool is explained below. In addition, the sample holder 250 and the applicator 300 may be provided as an integral one (unit) or as a set, as described above.

Figure 11:
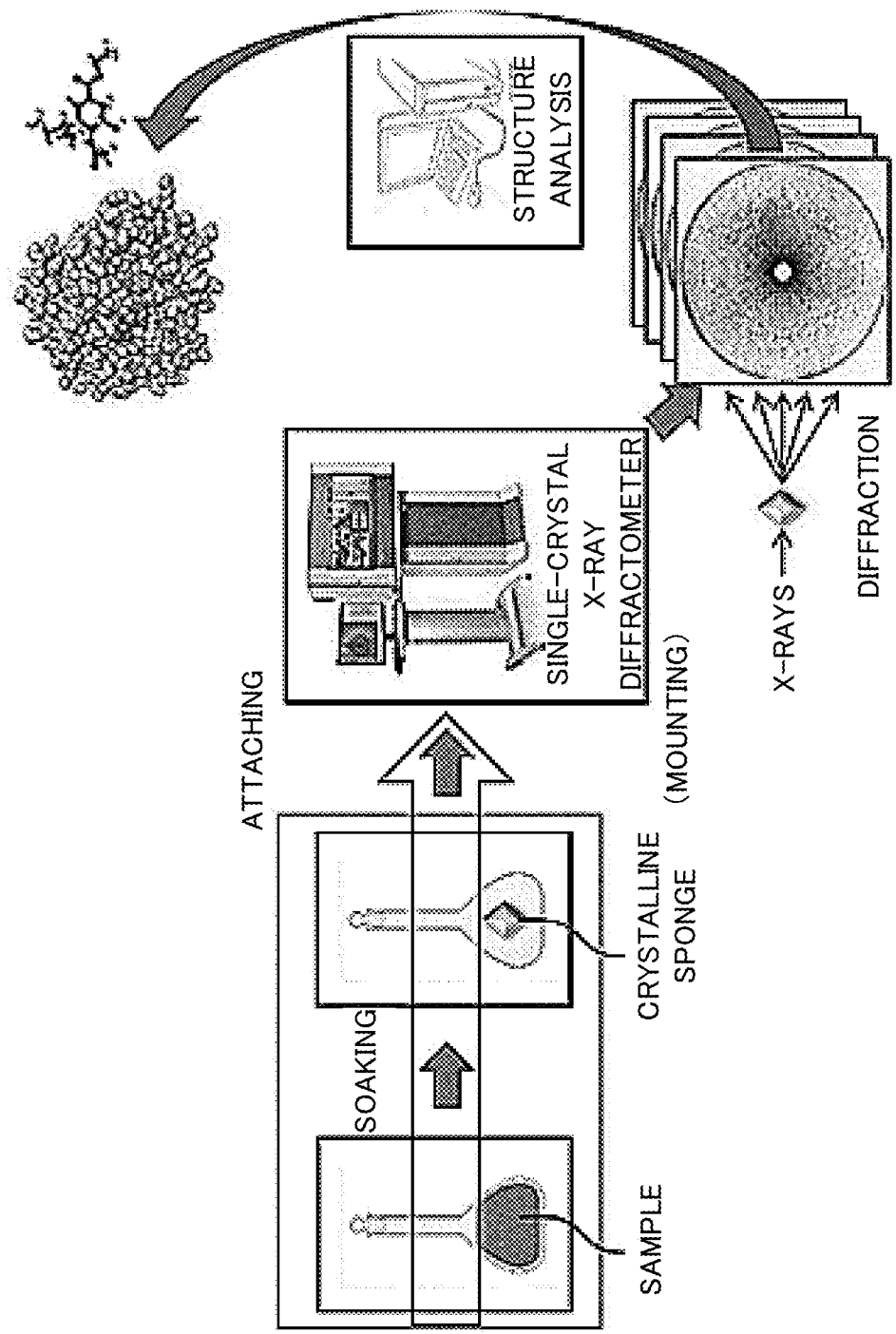
FIG. 11 is a flow diagram showing one example of a single-crystal X-ray structure analysis method using a sample holder.

FIG. 11 shows one Example according to the present invention given by conceptualizing the single-crystal X-ray structure analysis method using the sample holder 250 and the applicator 300. According to such a method, as described above, a very small amount of the sample is introduced into the sample holder 250 provided with the applicator 300 as an integral one (unit) to perform soaking required therein. In this case, according to the above-described example, in the state where the sample holder 250 is stored inside the applicator 300, the sample can be soaked in the crystalline sponge 200 attached to the tip of the sample holder 250 by inserting a pair of the sample introduction tubes 254, 254 into a pair of the fine through holes 253, 253 (Refer to FIG. 8) formed in the sample holder 250, or a pair of the fine through holes 303, 303 (Refer to FIG. 9) formed in the applicator 300.

Figure 12:
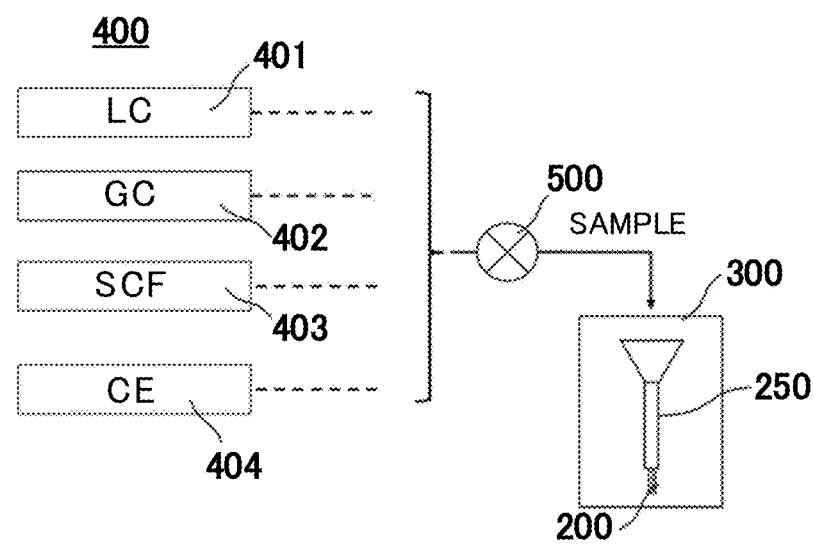
FIG. 12 is a diagram showing one example of a pretreatment device used in the above-described single-crystal X-ray structure analysis method.

More specifically, as shown in FIG. 12, for example, a very small amount of the sample S extracted by LC (liquid chromatography) 401, GC (gas chromatography) 402, and further, SFC (supercritical fluid chromatography) 403, CE (electrophoresis) 404 and so forth that constitute a pretreatment device 400 is supplied to a pair of the sample introduction tubes 254, 254 (Refer to FIG. 8) to be inserted in the fine holes 253, 253 of the sample holder 250 or the fine holes 303, 303 of the applicator 300 through the soaking device (soaking machine) 500 provided with every kind of a switching valve and a pressure adjustment device, that supplies a fluid under the necessary conditions (flow rate and pressure), and the sample is selectively introduced into the storing space 301 inside the applicator 300. That is, the sample is sent to the sample introduction tube 254 on the supply side from a tube on the supply side, and is supplied to the sample holder 250 inside the applicator 300 from the tip portion of the sample introduction tube 254 on the supply side. Only the sample, or a solution in which the sample and the preserving solvent (carrier) are mixed is supplied by flowing inside the sample introduction tube 254 on the supply side. In this manner, a very small amount of the sample S introduced thereto comes into contact with the crystalline sponge 200 attached to the tip of the pin-shaped holding part 252 of the sample holder 250 inside the storing space 301 of the applicator 300, and the sample is soaked therein. In addition, examples of the electrophoresis device herein include various electrophoresis device concerning capillary electrophoresis, isoelectric point electrophoresis, and so forth. When using the soaking device 500, the excessive sample or a solution in which the sample and the preserving solvent (carrier) are mixed is discharged from the sample introduction tube 254 on the discharge side, after a predetermined time has elapsed in a state where the sample is injected. When not using the soaking device 500, the unnecessary preserving solvent (carrier) or solution flows inside the sample introduction tube 254 on the discharge side, and is discharged. Accordingly, it is possible that no sample flows through the sample instruction tube 254 on the discharge side. When using gas or supercritical fluid as a carrier, the carrier containing the sample is discharged.

Then, the sample holder 250 with which the step of soaking is completed is removed from the applicator 300, and is precisely attached to a predetermined position inside the single-crystal X-ray diffractometer 9, that is, to the goniometer head 121 at the tip portion of the goniometer 12, for example, by using a positioning mechanism such as the above-described magnetic force or the like. According to the foregoing, the crystalline sponge 200 attached to a part (tip) of the pin-shaped holding part 252 of the sample holder 250 is to be arranged to the tip portion of the goniometer 12, that is, to a position where X-ray beam is focused and irradiated from the X-ray tube 11 after soaking the sample is completed. In other words, the sample S soaked in the crystalline sponge 200 is precisely arranged at a predetermined position inside the single-crystal X-ray diffractometer 9, and the intensity of X-rays diffracted from the sample S is subsequently measured by the X-ray detector 22 to analyze a crystal structure thereof, and so forth.

In this manner, by using the sample holder 250 provided together with the applicator 300 as a unit (an integral one) according to the present invention, it becomes possible that a very small amount of sample is soaked in the crystalline sponge 200 having a very small size, that is combinedly attached beforehand to the sample holder 250 easily and safely by anyone, and subsequently, the sample S is quickly and safely installed to the goniometer 12 on a precise position with high accuracy in a short period of time in such an extent that the crystalline sponge is not broken due to drying, by removing the applicator 300 therefrom. In addition, then, it is identical to those in the current condition that diffraction and scattering of X-rays by an object material are measured while irradiating X-rays having a required wavelength to the sample S by the above-described single-crystal X-ray diffractometer 9, and the structure analysis is performed by a measurement application software constituting the above-described single-crystal X-ray structure analysis apparatus to carry out construction of molecular modelling, preparation of a final report, and so forth. That is, the present Example brings quick, safe and easy check of the molecular structure/aggregative structure (actual space) of a newly discovered or designed structure at sites and so forth of not only drug development and life science but also every kind of material research.

As described above in detail, according to the present invention, the single-crystal X-ray structure analysis using a very small and fragile crystalline sponge can be quickly, surely and easily performed without accompanying the conventionally required fine and precise operation by using a newly proposed sample holder unit comprising an applicator and a sample holder, even if not having specialized knowledge of X-ray structure analysis, in other words, a very versatile and user-friendly single-crystal X-ray structure analysis apparatus that is capable of high-yield and efficient performance of the single-crystal structure analysis using the crystalline sponge is achieved, and further, a method and a sample holder unit comprising an applicator and a sample holder therefor are provided.

In addition, though various Examples according to the present invention are described above, the present invention is not limited to the above-described Examples and includes various modified examples. For example, the above-described Examples describe the entire system in detail in order to facilitate understanding of the present invention, but are not necessarily limited to those having all the configurations that have been described. Further, a part of a configuration of one Example may be replaced with a configuration of another Example; further, a configuration of another Example may be added to a configuration of one Example; and with respect to a part of a configuration of each Example, addition/deletion/replacement of another configuration may be further performed.

The present invention is widely applicable for a searching method of a material structure, an X-ray structure analysis apparatus used for the same, and so forth.

In addition, the present international application claims priority under Japanese Patent Application No. 2018-217815, filed Nov. 21, 2018, and the entire content of Japanese Patent Application No. 2018-217815 is applied to the present international application.

EXPLANATION OF THE SYMBOLS

1 . . . Single-crystal X-ray structure analysis apparatus (whole), 9 . . . Single-crystal X-ray diffractometer, 11 . . . X-ray tube, 12 . . . Goniometer, 22 . . . X-ray detector, 102 . . . Measurement device, 103 . . . Input device, 104 . . . Image display device, 107 . . . CPU, 108 . . . RAM, 109 . . . ROM, 111 . . . Hard disk, 116 . . . Analysis application software, 117 . . . Measurement application software, 121 . . . Goniometer head, 250 . . . Sample holder, 200 . . . Crystalline sponge, 251 . . . Base part, 252 . . . Pin-shaped holding part, 253 . . . Fine hole, 254 . . . Sample introduction tube, 300 . . . Applicator, 301 . . . Storing space, 302 . . . Opening, and 303 . . . Fine hole.

The invention claimed is:

1. A sample holder unit used for a single-crystal X-ray structure analysis apparatus, the sample holder unit comprising:
a sample holder for being attached to a goniometer in the single-crystal X-ray structure analysis apparatus, and
an applicator that stores the sample holder,
wherein the sample holder comprises a holding part that holds a porous complex crystal capable of soaking a sample in a plurality of fine pores formed therein, and the applicator comprises a space for soaking the sample in the porous complex crystal of the sample holder,
wherein the applicator comprises a space for soaking the sample in the porous complex crystal of the sample holder,
wherein the porous complex crystal is soaked only in a preserving solvent in the space.

2. The sample holder unit according to claim 1, wherein a sample introduction structure introduced into the space for soaking the sample therein is formed in the sample holder or the applicator.

3. The sample holder unit according to claim 1, wherein the porous complex crystal is attached to a tip position of the holding part.

* * * * *